United States Patent [19]

Pollastri et al.

[11] 3,933,639

[45] Jan. 20, 1976

[54] APPARATUS FOR PREPARING BEVERAGES

[75] Inventors: Livio Pollastri; Franco Tessarolo, both of Pordenone, Italy

[73] Assignee: Industrie A. Zanussi S.p.A., Pordenone, Italy

[22] Filed: Feb. 15, 1974

[21] Appl. No.: 443,103

[30] Foreign Application Priority Data

Feb. 16, 1973 Italy .................................. 20518/73

[52] U.S. Cl. .................. 210/149; 62/347; 210/152; 210/248; 261/DIG. 7

[51] Int. Cl.² ........................ B01D 9/00; B01D 3/42

[58] Field of Search ........... 210/149, 138, 181, 175, 210/152, 248; 62/347; 261/140, 153, DIG. 7

[56] References Cited

UNITED STATES PATENTS

| | | | |
|---|---|---|---|
| 2,752,230 | 6/1956 | Lindlay | 210/181 X |
| 3,045,446 | 7/1962 | Thomas | 62/347 X |
| 3,220,214 | 11/1965 | Cornelius | 62/347 |
| 3,254,501 | 6/1966 | Brysselbout | 62/347 X |
| 3,407,621 | 10/1968 | Dedwcks et al. | 62/347 |
| 3,454,491 | 7/1969 | Colburn | 210/149 |
| 3,499,530 | 3/1970 | McKay | 210/149 X |
| 3,785,492 | 1/1974 | Mazza | 210/149 |

*Primary Examiner*—Theodore A. Granger
*Attorney, Agent, or Firm*—Holman & Stern

[57] ABSTRACT

A machine for preparing and dispensing artificial mineral water is disclosed, of the kind in which water is previously demineralized by fractional crystallization of ice, the improvement consisting in the provision of shower diffusion means for spreading the water to be demineralized onto the surface of the principal evaporator, water collecting means beneath the evaporator, chute means for collecting the ice as formed on the evaporator and for sending it to a container where the ice is melted and means to transfer at least a portion of the molten ice to a mineralizing and possibly to a carbonating device.

10 Claims, 9 Drawing Figures

Fig.1

APPARATUS FOR PREPARING BEVERAGES

BACKGROUND AND SUMMARY OF THE INVENTION

This invention relates to an apparatus of the household type for the preparation of beverages, more particularly of artificial mineral water.

In U.S. Pat. application Ser. No. 122,488 filed Mar. 9, 1971, now U.S. Pat. No. 3,785,492 there is disclosed an apparatus of the kind referred to above, which comprises as its characteristic component parts a demineralizing device for the feeding water of the apparatus, a mineralizing device having the object of introducing in the demineralized water the ions which are characteristic of the mineral water one desires to obtain, and control means for the automation of the machine. More particularly, demineralization is obtained by the agency of a distillation apparatus, the use of which is efficient but, due to its known operating principle, causes a considerably high running cost of the entire machine.

To correct this defect, there has been suggested in U.S. Pat. No. 3,785,492 an apparatus of the kind referred to above, in which the demineralization of water is obtained by fractional crystallization.

Fractional crystallization is obtained by means of a refrigerating circuit whose evaporator can be displaced by the agency of a linkage from a collecting container for the feeding water to an ice collecting tank and vice versa, during the several stages of the operation. These displacements, moreover, are associated to appropriate reversals of the cycle of said refrigeration circuit.

This latter approach affords a substantial economy in operation but gives rise to another technical problem, that is, that of the presence of movable mechanical component parts. This fact involves reliability problems and wear problems of the component parts which are subjected to frictional forces, the construction of these parts being comparatively intricate.

An object of the present invention is to combine the advantages of the approaches indicated above, while simultaneously removing all the defects, thus providing a beverage preparing machine capable of a virtually static operation.

This object is achieved according to the invention by means of an automatic household-type apparatus for the preparation of beverages, especially artificial mineral water, comprising a demineralizing device having a refrigeration circuit with a principal evaporator and an auxiliary evaporator for the fractional crystallization of the fed-in water, a mineralizing device having the purpose of introducing in the demineralized water the ions which are characteristic of the mineral water one desires to obtain, and control means for the automation of the machine. The present apparatus includes shower means for the diffusion of the fed-in water onto the outer surface of the principal evaporator, which is in a fixed position in said refrigeration circuit, a tray adapted to receive the fed-in water and to collect the water dripping from said evaporator, circulation means for sending to said shower diffuser the water contained in said tray, chute means adapted to convey the ice formed on said evaporator and separated therefrom through its heating in a conventional manner in a container wherein first heating means are housed for melting said ice, siphoning means for transferring at least a part of the melted water into said mineralization device and then into a reservoir adapted to store the mineralized water and equipped with means for controllably dispensing same.

The features and advantages of the invention will become more clearly apparent from the ensuing description, given by way of nonlimiting example only, of a preferred embodiment of the subject machine.

BRIEF DESCRIPTION OF THE DRAWING

This description is referred to the accompanying drawings, wherein.

DESCRIPTION OF THE PREFERRED EMBODIMENTS

Figure 1:
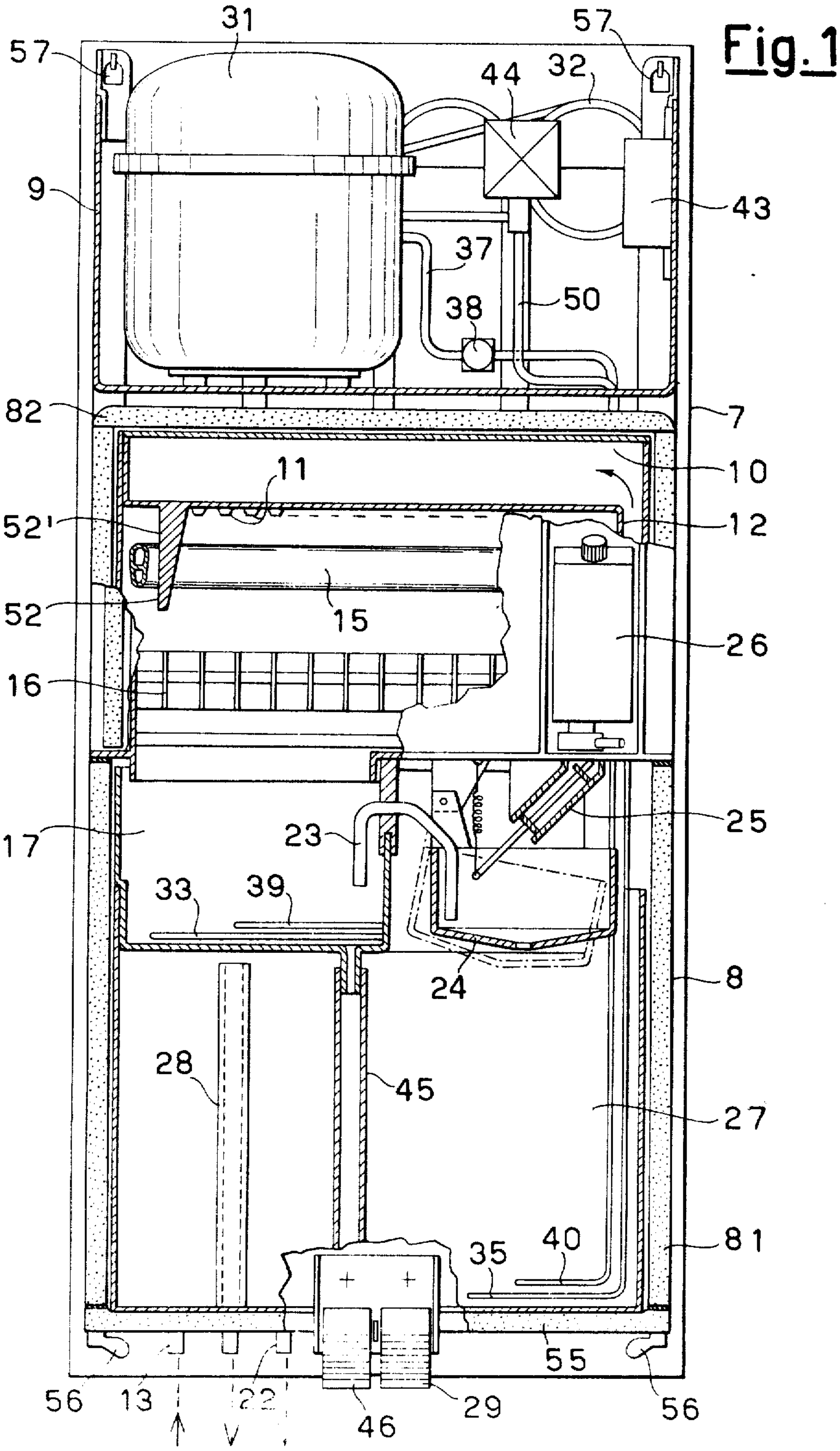
FIG. 1 shows a front cross-sectional view of the machine according to the invention.
Figure 2:
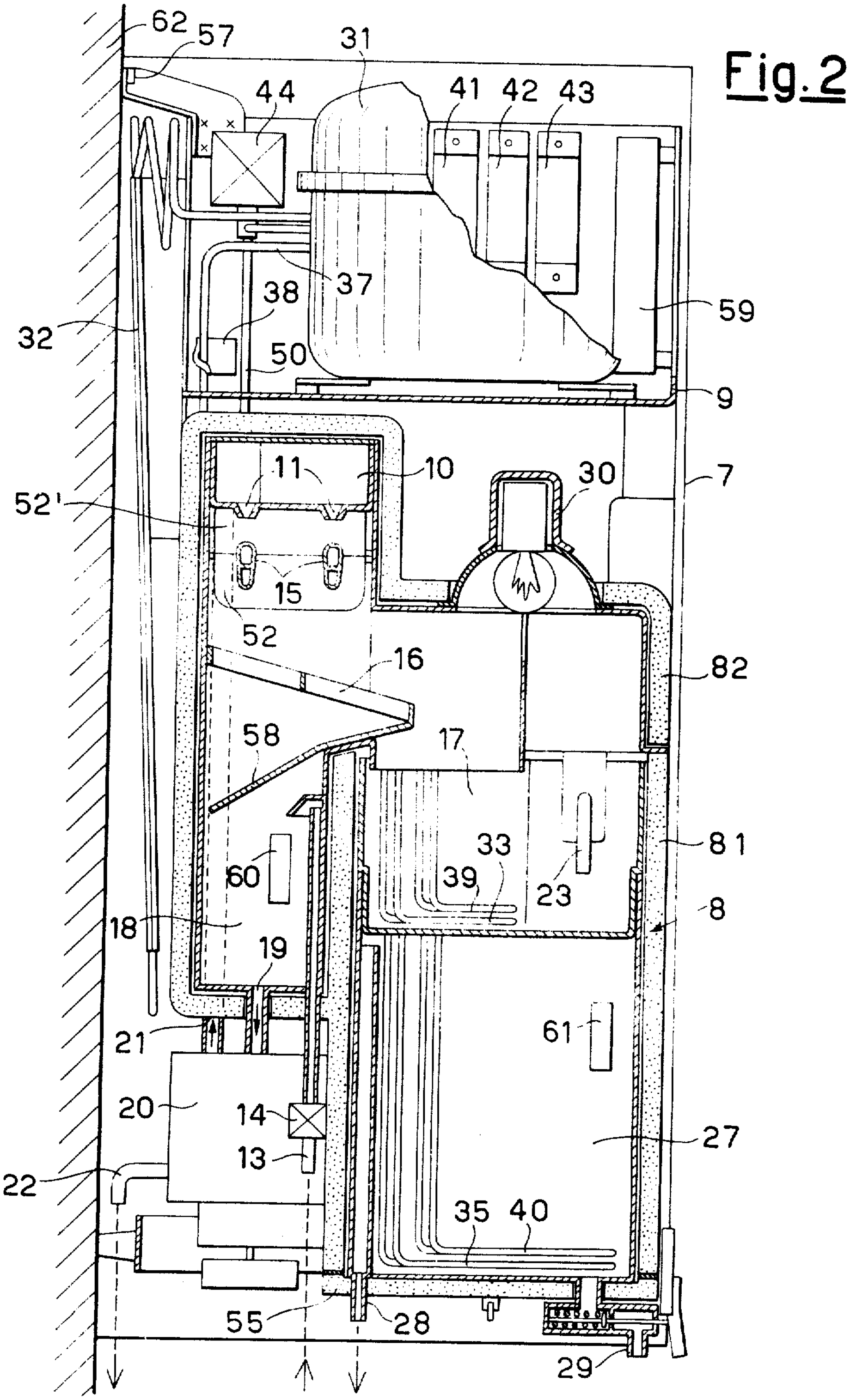
FIG. 2 shows a lateral cross-sectional view of the machine of FIG. 1.

Having reference to FIGS. 1 and 2, the machine according to the invention comprises an outer shell 7 which mainly contains a housing which is hermetically sealed and insulated, 8, which is preferably made with an expanded form shaped as in FIG. 2.

In the housing 8 there is arranged a shower diffuser 10, having a boxlike form and having two parallel rows of holes 11 through which emerges the water fed to the diffuser through an inlet mouth 12 (it should be recalled that the arrows shown in the drawing indicate the direction of flow of the several fluids they represent).

The fed-in water is mainly drawn, through a duct 13 controlled by a loading electro magnetic valve 14, from the usual water main.

Figure 6:
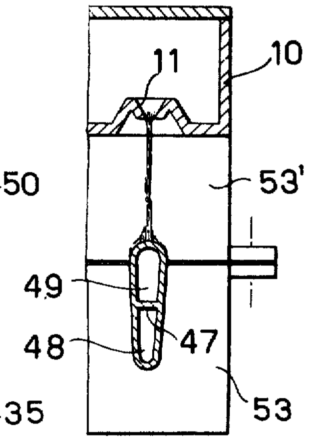

Horizontally below the diffuser 10 there is arranged the principal evaporator 15 of a refrigerating circuit which will be described hereinafter. Such an evaporator has substantially a U shape and is arranged in registry with the holes 11. In addition, the evaporator 15 has a cross-sectional shape which is of a vertically elongate tubular outline which gradually tapers downwards as shown in FIG. 6.

Beneath the evaporator 15 there is arranged a foraminous grid 16, having an appropriate length and inclined towards a container 17.

To the grid 16 there is affixed a plate 58, which is also inclined but in the opposite direction and is extended through a certain length over a tray 18 which collects the fed-in water.

In the tray, a pressure-stat 60 is appropriately housed.

The collected water is conveyed, through a duct 19, partly to a pump 20 which feeds it to the diffuser 10 via a duct 21, and partly to a discharged duct 22, for example through a device (not shown) such as described in Italian Utility Model No. 154,985.

The container 17 has a duct 45 which is in direct communication with a dispensing cock 46.

The container 17 is also in communication, through a siphon 23, with the rocking tray 24 (shown in FIG. 1 in two operative positions, in solid and dotted lines, respectively) of a mineralizing device of the kind disclosed in Italian Utility Model No. 151,655.

Such a mineralizing device comprises also a distributor 25 for the mineralizing salts and a rechargeable container 26 therefor.

Beneath the tray 24 there is arranged a tank 27 for the mineralized water, equipped with a conventional discharge device 28 for the overflow conditions and with a dispensing cock 29. A device similar to the device 28 is also provided (but it is not shown) in the interior of the tray 18.

Above the container 17 and the tank 27, in which a pressure-stat 61 is housed, there is arranged a sterilizing lamp 30, which is conventional and is properly fastened to the housing 8. It should be noticed that such a housing is preferably formed by a central body 81, a baseplate 55 and a top portion 82, which are hermetically sealed to each other.

Above the housing 8 there is arranged, affixed to a supporting member 9, a compressor 31 for the refrigeration circuit.

Figure 3:
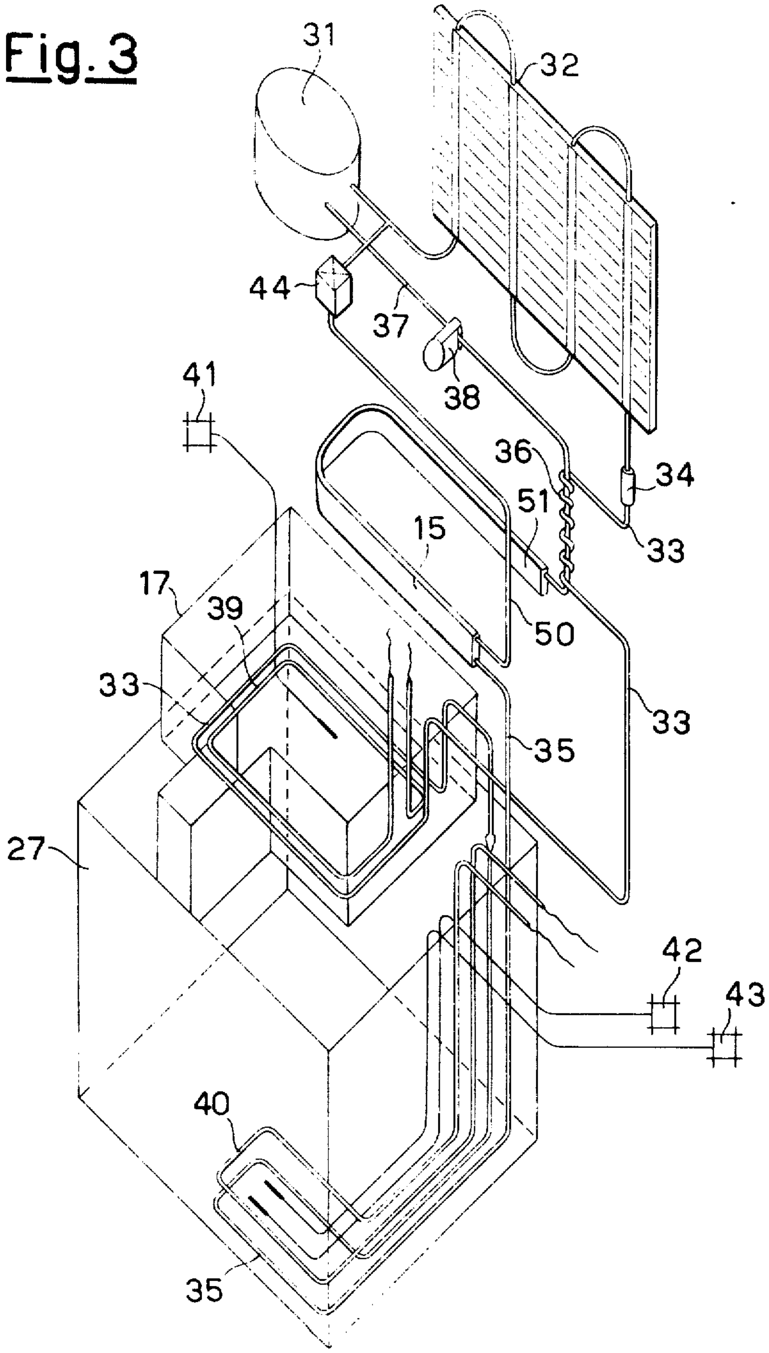
FIG. 3 diagrammatically shows the refrigeration circuit of the machine of FIG. 1, with a few water-conditioning means and the relevant control devices.

Having now particular reference to FIG. 3, such a circuit comprises a first loop comprising the compressor 31, the condenser 32, the capillary tube 33 (connected to the compressor through a dehydrating filter 34 and partially housed in the container 17), an auxiliary evaporator 35 (substantially housed in the tank 27), the principal evaporator 15, the heat exchanger 36, the intake duct 37 (having a thermostat 38 sensitive to the temperature of the coolant).

In the tank 17 and the reservoir 27 there are also housed, respectively, electric heating resistors 39 and 40, such as the sensing members of the thermostats 41, 42, 43.

All these thermostats and said pressure-stats are a part of an electric circuit (conventional and not shown) which is adapted automatically to govern the several working functions of the machine and comprising a programmer 59 (FIG. 2).

The refrigerating circuit also comprises a second loop formed by the compressor 31, the electro magnetic valve 44 for deviating the fluid emerging from the compressor, the duct 50, the evaporator 15, and the intake duct 37 (with the thermostat 38).

Figure 4:
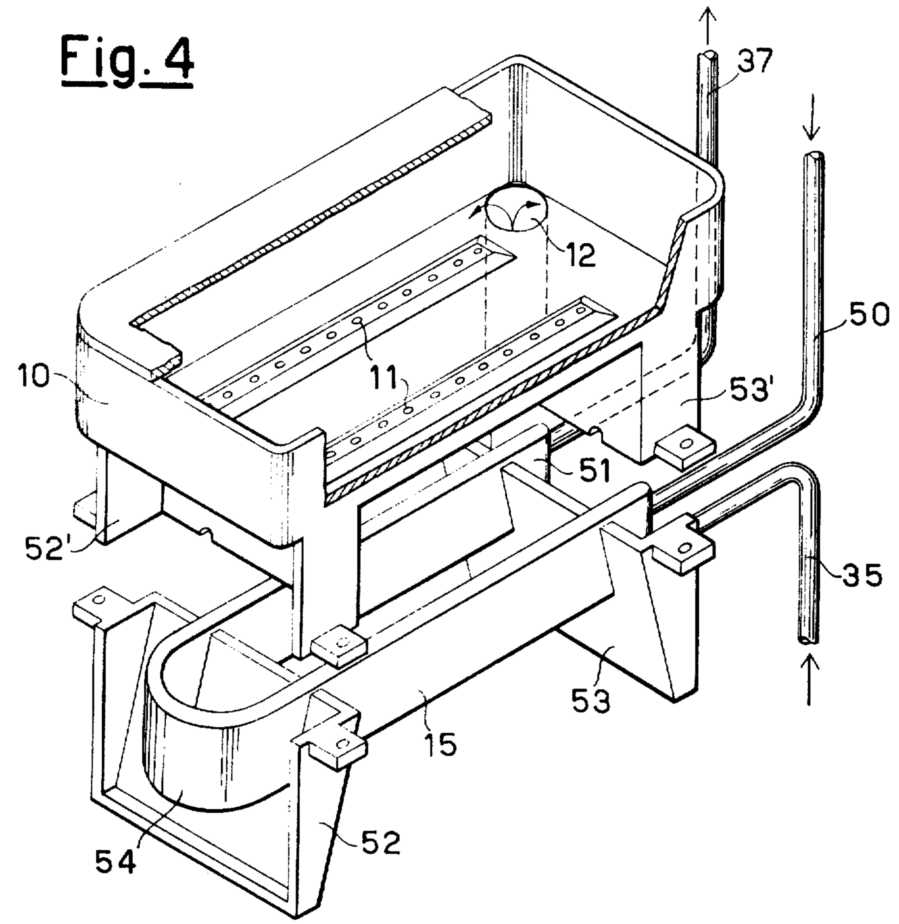
FIG. 4 shows a perspective view, partly in cross-section, of a detail of the machine of FIG. 1.
Figure 5:
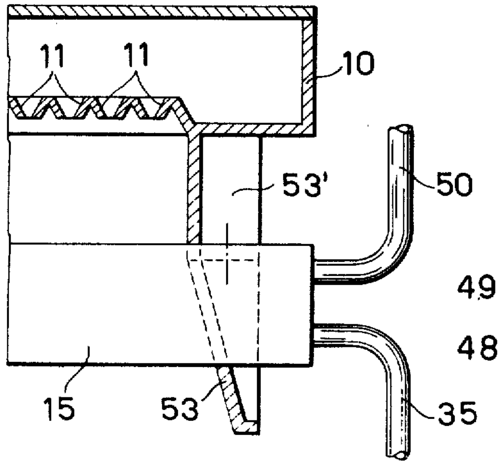
FIG. 5 and 6 show respective cross-sectional views of the detail of FIG. 4.

Having reference primarily to FIGS. 4, 5 and 6, the evaporator 15 has an inner longitudinal partition wall 47 which is extended through almost its entire length. By so doing, there are defined in the interior of the principal evaporator two discrete loops, 48 and 49, the former coming from the auxiliary evaporator 35, and the second coming from the duct 50. After a certain route, in the interior of the evaporator 15 and preferably near its end 51, the loops 48 and 49 merge to make up said intake duct 37.

Two straps 52 and 53, shaped and fastened to the evaporator 15 as shown in FIG. 4, support the latter and connect it to the diffuser 10 and are conventionally engaged (for example by means of screws) with the respective straps 52′ and 53′ which are integral with the diffuser 10 aforementioned.

More particularly, the stirrups 52 and 52′ shield the curved portion 54 of the evaporator 15 from the water dripping through the holes 11, thus preventing the formation of ice on said portion. This is because, as is known, the ice which is formed on a curved surface can be stripped from a curved surface less easily than from a rectilinear surface, that which (as will become more clearly apparent hereinafter) could adversely affect the satisfactory operation of the whole machine.

As already pointed out, all the means and devices intended for the treatment of water are housed in the interior of the housing 8, whose baseplate 55 is normally maintained, for example by fly nuts 56, in the closed position. The baseplate 55 can thus easily be removed for the inner cleaning of the housing 8 which, when open, permits the withdrawal of the tank 27 and thus also of the other members, which can thus be cleaned in turn. Preferably, the baseplate 55 is integral with the bottom of the tank 27 which can thus be automatically withdrawn along with the baseplate.

Lastly, the apparatus as described herein is equipped with rings 57 (FIGS. 1 and 2) by means of which it can be hung to any wall 62 (FIG. 2).

In operation, inasmuch as the tray 18 is initially empty, the pressure-stat 60 permits the opening of the electro magnetic valve 14, so that feeding water can be charged, through the duct 13. As the water in the tray 18 has reached a preselected level, the pressure-stat 60 closes the electro magnetic charging valve 14 and permits, through the programmer 59, the actuation of the pump 20 and the compressor 31. Since the electro magnetic valve 44 is closed, the first loop of the refrigeration circuit as operative; more particularly, the coolant flowing through the capillary tube 33 undergoes a first slight expansion in the auxiliary evaporator 35 (which slightly cools) and a more intense expansion in the evaporator 15 (which cools considerably).

Simultaneously, the pump 20 sends the water contained in the tray 18, through the duct 21 and the mouth 12, to the diffuser 10. Thus, through the holes 11, the water drips evenly distributed on the evaporator 15 (or, better to speak, on the portion thereof which is comprised between the straps 52, 52′ and 53 53′) being partially crystallized on its surface. More particularly, the ice tends to be formed (by gravity due to the shape of the evaporator and to the fact that, since the coolant flows along the loop 48, the latter is cooled more that the loop 49) on the bottom portion of the evaporator 15.

The water which did not crystallize drips, through the openings of the grid 16 and with a dampened noise from the plate 58 onto the collecting tray 18, wherefrom it is then partially recycled towards the diffuser 10 by the agency of the pump 20.

A portion of the collected water is, conversely discharged, as outlined above, through the duct 22; for an understanding of the discharging device reference is made to the above cited Italian Utility Model No. 154,985.

At a preselected instant of time the programmer 59 controls the opening of the electro magnetic valve 44, so that the coolant of the refrigeration circuit finds a leeway along the second loop, that is through the same electro magnetic valve 44.

By so doing, the compressed coolant (which is thus in the stat of a hot gas) heats the evaporator 15, more particularly its loop 49, thus giving rise to a partial melting and separation of the ice from the evaporator 15.

It should be noticed that the expedient as described herein of the more intense cooling of the loop 48 and the more intense heating of the loop 49 of the principal evaporator permits (as has been ascertained also experimentally) the formation and the separation, respectively, of the ice with a minimum water loss and thus with an optimum efficiency of the whole machine.

The ice which is separated from the principal evaporator falls by gravity on the grid 16 which causes it to slide and then fall in the container 17, where it is melted by the heating action of the portion of the capillary tube 33 housed therein.

The resistor 39 contributes towards the melting of the ice when this is possibly allowed by the thermostat 41, responsive to the temperature obtaining on the bottom of the container 17. This fact permits an efficient balancing of the heat requirements consistently with the ambient conditions in which the machine is caused to operate.

A portion of the melted water (demineralized) is transferred through the siphon 23 to the mineralizing device, where it receives the appropriate salt dosage, substantially as described in the above cited Italian Utility Model No. 151,655 (the only difference being that these salts are now preferably in the liquid state). Upon mineralization, water (or in any case the obtained beverage) is forwarded by gravity to the reservoir 27 where it is continually sterilized (such as the melted water contained in the tank 17) due to the action, known per se, of the lamp 30.

Since after the separation of the ice from the evaporator 15 the thermostat 38 detects a certain temperature of the hot gas flowing through the duct 37 (a temperature at which the ice has been certainly stripped), the thermostat 38 controls the closing of the electro magnetic 44 again, thus causing the restoration of the first loop of the refrigeration circuit.

Should the water as stored in the tank 27 not reach a preselected lever, after the stripping of the ice from the evaporator 15, a subsequent operative cycle identical to the one described above is started.

When, conversely, the water in the tank 27 attains said preselected level, this fact is detected by the pressure-stat 61 which controls, in a conventional manner, the stop of the operation of the machine. More particularly, the pressure-stat 61 permits, through the programmer 59, to block both the compressor 31 and the pump 20.

This condition remains unaffected until, due to the effect of dispensing operations (through the cock 29) of the stored water, the level of the water decreased to such an extent as to come below the preselected level, so that the pressure-stat 61 allows the operation of the machine once again for the production of additional amounts of mineral water.

The auxiliary evaporator 35 (whose operation is determined by the thermostat 43 acting upon the compressor 31) and possibly the resistor 40 (whose feed is controlled by the thermostat 42) permit to carry out a thermal conditioning of the stored water, which is thus maintained at a preselected temperature.

It should be noticed that the apparatus can dispense also demineralized water only, that is the water as contained in the container 17 and fed through the duct 45 to the cock 46.

Figure 7:
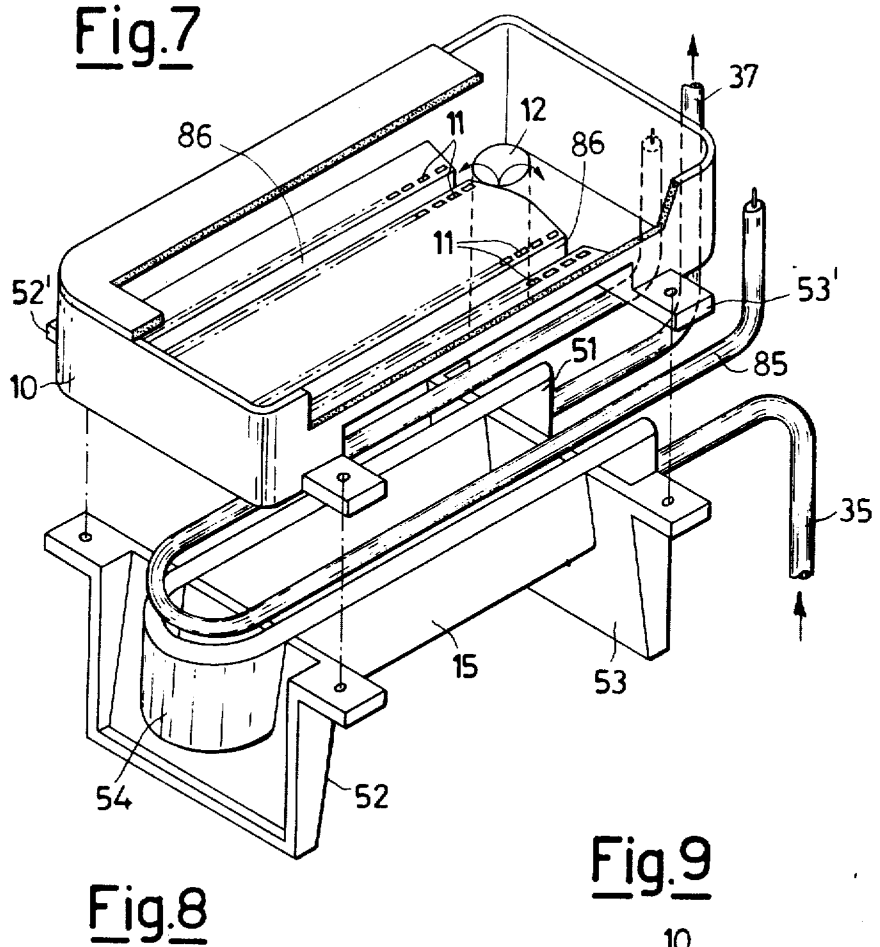
FIGS. 7, 8 and 9 show a perspective view and two partial cross-sectional views of a preferred embodiment of the detail of FIGS. 4, 5 and 6.
Figure 8:
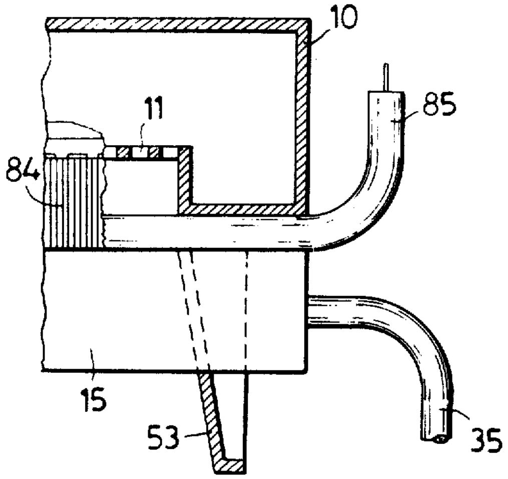
Figure 9:
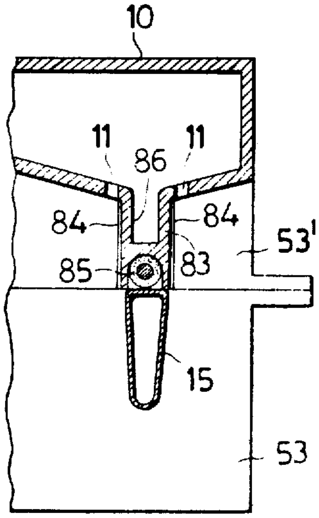

In a preferred embodiment (FIGS. 7 to 9) the bottom of the boxlike container (or diffuser) 10 is provided with two portions 83 which protrude towards the bottom until being immediately adjacent to, and preferably in contact with, the top surface of the principal evaporator 15. The holes 11 are arranged on the bottom of the diffuser 10 in alignment with the sides and in the vicinity of the projections 83, so that the fed-in water emerging from the holes aforesaid may fall to sweep the outer surface of the evaporator 15 (with the exception, obviously of the top portion which is not exposed), and crystallizes in layers thereon. In this connnection, the portions 83 protrude along a length which is proportional to the speed at which the water flows and their outer sidewalls are equipped with appropriate vertical ridges 84. These expedients act in such a way that the fed-in water is directed towards the evaporator 15 with an orderly and laminar flow, so as to originate an optimum fractional crystallization the evaporator, the interior of which is hollow and defines a path for the coolant of the associated refrigeration circuit (FIG. 3), which in this case is deprived of the duct 50 and the relevant electro magnetic valve 44. It should be noted that the ridges 84 of the sidewalls of the projections 83 can be replaced by an appropriate chemical or mechanical treatment of the walls, adapted to afford an orderly and laminar flow of the water emerging from the holes 11.

In correspondence with the zone of contact with the evaporator 15, the projections 83 are equipped with a seat in which a heating electric resistor 85 is housed, preferably in direct contact (for a good heat transfer) with the top surface of the evaporator 15. At least the bottom wall of the diffuser 10 is of a heat-resistant and heat-insulating material, for example, a thermoplastic material also having appropriate hygienic properties, so that ice is formed only, as aforesaid, on the exposed surface of the evaporator 15.

The resistor 85, properly fed by the programmer 59 (FIG. 2) of the subject apparatus has the task of causing the partial melting and thus the stripping of the ice from the evaporator 15. Due to the expedients as now described, such stripping is rapid and takes place with a reduced melting of the ice and thus the amount of unused water is small. This fact obviously allows the apparatus according to the invention to provide a higher overall efficiency and thus, when the performances are equal, the overall size can be reduced. As is known, the problem of the reduction of size is of considerable importance in household appliances. In addition, in the projections 83 a groove 86 is formed, which communicates with the interior of the diffuser 10, and the bottom of the latter is inclined towards the groove of each projection. Bottom and grooves 86 are also inclined towards the inlet mouth 12 of the fed-in water, as formed on a side of the bottom wall aforementioned. By so doing, in the periods of stoppage of the circulation pump 20 (FIG. 3) a fraction of the water which is present in the interior of the diffuser flows over the bottom thereof and, by sweeping off from the holes 11 the possibly accumulated foreign particulates, is collected in the grooves 86, and is sent to the inlet mouth 12 (which in these stages acts as return duct) and is finally sent to the sink 22. This cyclical scavenging action of the holes 11 prevents their clogging and thus the reliability of the entire machine is improved.

From what has been described the advantages of the subject machine are apparent and can be summarized in terms of a constructional and operative simplicity, reliability due to a substantially static operation, and a operating cost.

Obviously, the machine as described can receive all the modifications which lie within the scope of the invention; more particularly, all the controls can be associated to each other in any way, provided that the overall operability of the machine remains unaltered.

Lastly, the machine in question can be equipped with a water carbonator of any conventional make.

What is claimed is:

1. An automatic household type machine for preparing beverages, more particularly artificial mineral water, comprising water feeding means, a demineralizing device provided with means for the fractional crystallization of the fed-in water, a mineralizing device for introducing into the demineralized water the ions which are characteristic of the mineral water to be obtained, a tank for receiving and storing the mineralized water, controlled dispensing means for mineralized water in the tank and control means for automating the machine operation, the demineralizing device comprising a refrigeration circuit including a compressor, a principal evaporator which is U-shaped and arranged horizontally, said principal evaporator having a vertical cross-section in a vertically elongated tubular form which gradually tapers downwards, an auxiliary evaporator and a capillary tube with restrictor function, shower diffusion means formed by a boxlike container equipped at is bottom with a plurality of holes which are placed directly above the U-shaped principal evaporator to diffuse by dripping the fed-in water onto the outer surface of the principal evaporator, a tray located below the principal evaporator to collect the water dripping therefrom, circulating means for sending to the shower diffusion means at least a part of the water collected in the tray, first heating means associated with an upper portion of the principal evaporator to cause stripping of the ice formed on the principal evaporator and chute means located below the principal evaporator to collect the ice stripped from the principal evaporator and convey it towards an ice melting container in which at least a part of the capillary tube is housed, siphoning means being provided for transferring at least a fraction of the melted ice through the mineralizing device to the mineralized water storing tank and second heating means being housed in the tank together with the auxiliary evaporator and controlled by the control means so as to maintain the stored water, in combination with the auxiliary evaporator, at a pre-selected temperature.

2. A machine according to claim 1, wherein said principal evaporator has an inner longitudinal partition wall so as to define two loops for the fluid coolant, a first loop for the cold fluid coming from the auxiliary evaporator and a second loop for the hot heating fluid coming from the compressor, said first and second loops having a single outlet towards said compressor and having in addition sections which are substantially of the same surface area.

3. A machine according to claim 1, wherein the outer surface of said principal evaporator and the bottom of said boxlike container are immediately adjacent to one another, preferably in mutual contact, said holes being formed on the container in the vicinity of the contact area between the bottom and said evaporator in such a way that the water emerging from said holes falls to sweep the outer surface of the evaporator with the exception of the top portion thereof.

4. A machine according to claim 3, wherein the bottom of said boxlike container is provided, in correspondence with said contact area, with a seat in which a heating device is housed which is adapted to supply heat to said principal evaporator.

5. A machine according to claim 4, wherein said heating device comprises an electric resistor arranged in contact with the top surface of said principal evaporator.

6. A machine according to claim 3, wherein at least the bottom of said boxlike container is of a heat-resistant and heat insulating material, such as a thermoplastic material.

7. A machine according to claim 3, wherein, in correspondence with said contact area, the bottom of said boxlike container projects downwards along a length which is proportional to the speed of flow of the fed-in water.

8. A machine according to claim 7, wherein the outer side surfaces of said projection of the container bottom have vertical grooves which are adapted to ensure an orderly and laminar flow of the water emerging from said holes.

9. A machine according to claim 7, wherein the outer side surfaces of said projection of the container bottom are treated either chemically or mechanically so as to ensure an orderly and laminar flow of the water emerging from said holes.

10. A machine according to claim 7, wherein the circulation means cyclically send the fed in water to an inlet mouth of said boxlike container, wherein the bottom of the container is inclined towards a groove formed on the bottom of said container in correspondence with said projection and thus overlies along at least a portion of the top surface of the principal evaporator, said groove and said bottom being, in addition, inclined towards said inlet mouth, which is also formed on said bottom.

* * * * *